(12) United States Patent
Kasowski

(10) Patent No.: US 9,828,501 B2
(45) Date of Patent: Nov. 28, 2017

(54) FLAME RETARDANT WITH COMPOSITIONS

(76) Inventor: Robert Valentine Kasowski, West Chester, PA (US)

( * ) Notice: Subject to any disclaimer, the term of this patent is extended or adjusted under 35 U.S.C. 154(b) by 689 days.

(21) Appl. No.: 14/117,427

(22) PCT Filed: May 19, 2012

(86) PCT No.: PCT/US2012/000247
§ 371 (c)(1),
(2), (4) Date: Nov. 29, 2014

(87) PCT Pub. No.: WO2012/166210
PCT Pub. Date: Dec. 6, 2012

(65) Prior Publication Data
US 2015/0080486 A1  Mar. 19, 2015

Related U.S. Application Data

(60) Provisional application No. 61/519,743, filed on May 28, 2011, provisional application No. 61/628,829, filed on Nov. 7, 2011, provisional application No. 61/632,452, filed on Jan. 24, 2012.

(51) Int. Cl.
| | |
|---|---|
| *C08L 63/00* | (2006.01) |
| *C08L 63/04* | (2006.01) |
| *C09K 21/14* | (2006.01) |
| *C08K 5/52* | (2006.01) |
| *C08G 59/14* | (2006.01) |
| *C08L 33/14* | (2006.01) |

(52) U.S. Cl.
CPC .......... *C08L 63/04* (2013.01); *C08G 59/1488* (2013.01); *C08K 5/5205* (2013.01); *C08L 33/14* (2013.01); *C08L 63/00* (2013.01); *C09K 21/14* (2013.01); *C08L 2201/02* (2013.01)

(58) Field of Classification Search
CPC ...................................................... C08L 63/00
See application file for complete search history.

(56) References Cited

U.S. PATENT DOCUMENTS

| | | | | |
|---|---|---|---|---|
| 4,968,752 A * | 11/1990 | Kawamoto | ............. | C08L 23/08 524/517 |
| 6,479,574 B1 * | 11/2002 | Greigger | ............. | C08K 5/0025 379/386 |
| 7,235,604 B2 * | 6/2007 | Blondel | ................. | C08L 77/06 524/141 |
| 2002/0119317 A1 * | 8/2002 | Gan | ..................... | C08G 59/304 428/413 |
| 2003/0197159 A1 * | 10/2003 | Kinose | .................... | C08K 9/02 252/609 |
| 2005/0029499 A1 * | 2/2005 | Kasowski | .......... | C08K 5/34922 252/609 |
| 2006/0175587 A1 * | 8/2006 | Kasowski | ................ | C07F 9/09 252/601 |
| 2007/0221890 A1 * | 9/2007 | Gan | ................. | C07F 9/657172 252/601 |
| 2009/0048372 A1 * | 2/2009 | Kasowski | .......... | C07D 295/027 524/86 |
| 2009/0199994 A1 * | 8/2009 | Amano | ................. | C09K 5/063 165/10 |

* cited by examiner

*Primary Examiner* — Megan McCulley

(57) ABSTRACT

A flame retardant containing composition resistant to becoming sticky from moisture is prepared by the introduction of epoxy containing compound either into the ethyleneamine polyphosphates or into the polymeric composition.

22 Claims, No Drawings

FLAME RETARDANT WITH COMPOSITIONS

FIELD OF INVENTION

This invention relates to the compatibilization of flame-retardants with polymers and flame retardant containing compositions with improved moisture resistance.

BACKGROUND OF INVENTION

Ethyleneamine polyphosphates as described in U.S. Pat. No. 7,138,443, US patent application 20090048372, WO 2011/049615 are effective environmentally friendly halogen free flame retardants. It was indicated in these patents and applications that the ethyleneamine polyphosphates were applicable to all polymers as flame retardants. However, ethyleneamine polyphosphate has some deficiencies in practical use that has prevented these very powerful flame retardants becoming a commercial success: (1) Polymers containing high loadings of ethyleneamine polyphosphates are susceptible to becoming sticky when subjected to high humidity conditions. (2) Polymeric compositions can become inhomogeneous when loadings of ethyleneamine polyphosphates exceed 25% by weight, especially for polymers such as polypropylene and polyethylene. (3) Ethyleneamine polyphosphates come out of a vacuum dryer as large chunks and must be ground before use, which is difficult to do without allowing exposure to the moisture in air. Moisture resistance here means resistant to becoming sticky or tacky upon exposure to moisture. Moisture resistance is hereby defined as surface moisture that causes a residue on surface that is sticky to the touch.

It will be shown how such problems can be overcome.

SUMMARY OF INVENTION

This invention provides flame retardant compositions that provide flame retardation for a variety of applications, such as replacement of flame retardants containing halogens. The flame retardant used in many applications contain brominated or chlorinated compounds. There is a ready market for flame retardants that do not contain halogens, which this invention addresses. Thus, it is important that halogen free flame retardant containing compositions can be made at high loadings. Ethyleneamine polyphosphates are excellent flame retardants for polymers, but a sticky surface can occur at high loadings due to moisture absorption limiting their use.

Two options have been identified to form polymeric compositions that do not become sticky in high humidity situations. The first option is to react or cross link ethyleneamine polyphosphates with epoxy containing compound to form flame retardant compositions. The second option is to add the flame retardant along with epoxy containing compound to the polymer, where the reactions occur during mixing. Thus, this invention is a flame retardant composition comprising 55% to 99.5% by weight ethyleneamine polyphosphate cross linked with 45% to 0.5% by weight of an epoxy containing compound selected from the group consisting of polymer grafting agent; glycidyl epoxies further classified as glycidyl-ether, glycidyl-ester and glycidyl-amine; and glycidyl ethers of phenolic hydroxyl containing novolac resins. The invention can additionally include in the flame retardant composition 0.5% to 20% by weight of total composition an epoxy curing agent selected from the group consisting of waterborne curing agents, amidoamines, polyamides, aliphatic amines, polycabodiimide, modified aliphatic amines, anhydrides, ketimines, powder coating curatives, non-amine curatives, polyether amine, cycloaliphatic amine, modified cycloaliphatic amine, modified cycloaliphatic amine adduct, tertiary amine, dicy imidazole adduct, phenolic, phenolic novolac resin, polyamine, and non-mda aromatic amine. The addition of an epoxy curing agent can result in a flame retardant composition which is more difficult to melt into polymers. One of the key features of ethyleneamine polyphosphates are that they melt into polymers and retention of this property is important.

The second option of the invention is a flame retardant containing composition comprising: 1) 20% to 96% percent by weight polymer, 2) 80% to 1% of one or more flame retardants selected from the group consisting of flame retardant composition of option 1 and ethyleneamine polyphosphate and 3) 1% to 45% of an epoxy containing compound selected from the group consisting of polymer grafting agent; glycidyl epoxies further classified as glycidyl-ether, glycidyl-ester and glycidyl-amine; and glycidyl ethers of phenolic hydroxyl containing novolac resins, with the total composition being 100% by weight. The flame retardant containing composition additionally comprising 0.5% to 20% by weight of total composition an epoxy curing agent selected from the group consisting of waterborne curing agents, amidoamines, polyamides, aliphatic amines, modified aliphatic amines, anhydrides, ketimines, powder coating curatives, non-amine curatives, polyether amine, cycloaliphatic amine, modified cycloaliphatic amine, modified cycloaliphatic amine adduct, tertiary amine, dicy imidazole adduct, phenolic, polyamine, and non-mda aromatic amine For thermoplastic polymers, the flame retardant containing compositions can additionally contain 0.5 PHR to 8 PHR of peroxide per 100 parts resin selected from the group consisting of diacyl peroxides, peroxyesters, dialkyl peroxides, peroxyketals and peroxymonocarbonates. PHR is parts per hundred of resin.

It was clearly unexpected that the epoxy containing compound would cross link the ethyleneamine polyphosphates and that the compositions still melted into the polymer. It was completely unexpected that the incorporation of an epoxy containing compound into polymer compositions results in much better moisture resistance. It was also unexpected that reacting epoxy containing compounds with ethyleneamine polyphosphates has resulted in flame retardant compositions that are less than 50% soluble in water. The most moisture resistant flame retardant compositions are made with novolac epoxy resin.

The examples clearly show that the flame retardant compositions exhibit properties distinctly different from ethyleneamine polyphosphates and that these compositions have not exhibited the moisture shortcomings of ethyleneamine polyphosphates. Normally an epoxy resin is cross linked with an amine, which serves as the hardener. Here the amine containing compound, ethyleneamine polyphosphate, is cross linked by the epoxy. An additional amine such as triethylenetetraamine (TETA) can be added to further cure the reaction. TETA is a very common cross linker or hardener for epoxy resins.

DETAILED DESCRIPTION OF INVENTION

The synthesis of flame retardants using polyphosphoric acid are disclosed in U.S. Pat. No. 7,138,443, U.S. application Ser. No. 10/497,129; US patent application 20090048372, and WO 2011/049615. The entire disclosure is incorporated herein by reference.

Unless the context indicates otherwise, in the specifications and claims, the terms such as a flame retardant syrup, dehydrated ethyleneamine polyphosphate, flame retardant composition, filled flame retardant composition, flame retardant containing composition, polymer and flame retardant composition, filled flame retardant containing composition, ethyleneamine, polymer, and similar terms includes mixtures of such materials. Unless otherwise specified, all percentages are percentages by weight relative to total weight of composition and all temperatures are in degrees Centigrade (° C.). For a given composition, percentages are by weight of final composition. All thermo graphic analysis (TGA) is performed in nitrogen at 20° C. per minute. The composition may include the flame retardant and other ingredients as well as the resin. Gel refers to cross linked material that is difficult to dissolve for lack of a melting point.

Moisture resistance is hereby defined as surface moisture resistance or stickiness resistance and can be used interchangeably. Samples subjected to the humidity chamber conditions of 60° C. and 90% relative humidity for at least 12 hours receive a pass if samples not sticky to the touch and fail or f for samples that are sticky to the touch after exposure to the humidity test conditions. Samples that one is not sure if a surface residue is on the surface are given a pass and left in for another 12 hours. Stickiness could have a more formal definition as the amount of residue that comes off onto a surface that has been pressed onto a flame retardant containing composition of a particular surface area after a given time and applied pressure. At this time, no regulatory agency has put forth such a test. Thus, the qualitative test of sticky to the touch is used as fingers are very sensitive to stickiness and residue. Samples with greater than 40% loading of ethyleneamine polyphosphate have become very sticky in humidity chamber in this test, thus a clear cut method to measure this property.

In this disclosure, the word "copolymer" means a polymer polymerized from two or more monomers, and includes terpolymers. The more specific description 'ethylene acrylic acid copolymer', 'ethylene methacrylic acid copolymer', and the like, is meant to include copolymers which may also have a third monomer present. Grafting polymer, grafting agent or polymer grafting agent are used interchangeably.

The requirement of the epoxy containing compound is that it contain an epoxide, a cyclic ether with three ring atoms: two carbons and an oxygen. This ring is highly strained. The strained ring makes epoxides more reactive than other ethers. Here the epoxide is also referred to as a glycidyl epoxy, epoxy group, and glycidyl epoxide. Examples of epoxy containing compounds used here are 1) polymer grafting agent that contains this group and 2) epoxy resins. Other epoxy containing compounds should work.

Ethyleneamines are defined here as ethylene diamine and polymeric forms of ethylene diamine including piperazine and its analogues. A thorough review of ethyleneamines can be found in the Encyclopedia of Chemical Technology, Vol 8, pgs. 74-108. Ethyleneamine polyphosphates encompass a wide range of multifunctional, multireactive compounds. The molecular structure can be linear, branched, cyclic, or combinations of these. Examples of commercial ethyleneamines are ethylenediamine (EDA), diethylenetriamine (DETA), piperazine (PIP), triethylenetetramine (TETA), tetraethylenepentamine (TEPA), and pentaethylenehexamine (PEHA). Other ethyleneamine compounds which are part of the general term ethyleneamine which may be applicable are, aminoethylenepiperazine (EAP), 1,2-propylenediamine, 1,3-diaminopropane, iminobispropylamine, N-(2-aminoethyl)-1,3-propylenediamine, N,N'-bis-(3-aminopropyl)-ethylenediamine, dimethylaminopropylamine, and triethylenediamine. Etyleneamine polyphosphate can be formed with any of these ethyleneamines.

The ethyleneamine polyphosphates made by any technique are claimed here. These can be made by reacting an ethyleneamine with commercially obtained polyphosphoric acid or with polyphosphoric acid prepared by ion exchange as described in U.S. Pat. No. 7,138,443, U.S. application Ser. No. 10/497,129, US patent application 20090048372, and WO 2011/049615. It is preferred to use polyphosphoric acid prepared by ion exchange. It is more preferred to use that prepared by US patent application 20090048372 and it is most preferred that prepared by WO 2011/049615. In this most preferred synthesis, long chain sodium polyphosphate is dissolved in the low molecular weight ethyleneamine polyphosphate waste stream of previous run. This solution is passed through an ion exchange column acid form to make aqueous polyphosphoric acid. An ethyleneamine is added to the acid. A syrup precipitates to the bottom of reaction vessel, leaving low molecular weight waste stream in remaining dilute solution. The syrup is dried in a vacuum oven at 245° C. to a final vacuum of about 1-5 Torr to from ethyleneamine polyphosphate. The dilute waste stream from reaction vessel is saved for the next run resulting in nearly 100% yield. Also, the drying conditions for the syrup are such that most of the low molecular weight ethyleneamine polyphosphate in the syrup is converted to higher molecular weight via polymeric condensation. Different combinations of drying time, drying temperature, and vacuum strength can be used so long as the high molecular weight increase is obtained. The ethyleneamine polyphosphate can be made over a pH range of 1.5 to pH 8.5 and possibly wider. The preferred pH range is 2 to 6, the most preferred pH range is 3 to 5.5.

The preferred ethyleneamine polyphosphates are ethylenediamine polyphosphate, diethylenetriamine polyphosphate, triethylenetetraamine polyphosphate, piperazine polyphosphate, amino ethyl piperazine polyphosphate, and tetraethylenepentaamine polyphosphate. The most preferred are ethylenediamine polyphosphate, diethylenetriamine polyphosphate, triethylenetetraamine polyphosphate, and piperazine polyphosphate. All examples use ethyleneamine polyphosphate made with DETA and the ion exchange method. PNS refers to diethylenetriamine polyphosphate with the ethyleneamine being DETA.

The grafting agents containing the epoxy group are particularly well described in U.S. Pat. No. 6,805,956 and US application 20050131120 and those descriptions are used extensively in next six paragraphs. Polymeric grafting agents useful in the compositions of the invention are ethylene copolymers copolymerized with one or more reactive groups selected from unsaturated epoxides of 4 to 11 carbon atoms, such as glycidyl acrylate, glycidyl methacrylate (GMA), allyl glycidyl ether, vinyl glycidyl ether, and glycidyl itaconate, unsaturated isocyanates of 2 to 11 carbon atoms, such as vinyl isocyanate and isocyanato-ethyl methylacrylate, as well as unsaturated aziridines, silanes, or oxazolines and may additionally contain a second moiety such as alkyl acrylate, alkyl methacrylate, carbon monoxide, sulfur dioxide and/or vinyl ether, where the alkyl radical is from 1 to 12 carbon atoms.

In particular, the polymeric grafting agent is a copolymer of at least 50% by weight ethylene, 0.5 to 15% by weight of at least one reactive moiety selected from the group consisting of (i) an unsaturated epoxide of 4 to 11 carbon atoms, (ii) an unsaturated isocyanate of 2 to 11 carbon atoms, (iii)

an unsaturated alkoxy or alkyl silane wherein the alkyl group is from 1 to 12 carbon atoms, and (iv) an unsaturated oxazoline, and 0 to 49% by weight of a second moiety selected from at least one of an alkyl acrylate, alkyl methacrylate, vinyl ether, carbon monoxide, and sulfur dioxide, where the alkyl and ether groups above are 1 to 12 carbon atoms.

Preferred polymeric grafting agents for use in the compositions include ethylene/glycidyl acrylate, ethylene/n-butyl acrylate/glycidyl acrylate, ethylene/methylacrylate/glycidyl acrylate, ethylene/glycidyl methacrylate (E/GMA), ethylene/n-butyl acrylate/glycidyl methacrylate (E/nBA/GMA) and ethylene/methyl acrylate/glycidyl methacrylate copolymers. The most preferred grafting agents for use in the compositions are copolymers derived from ethylene/n-butyl acrylate/glycidyl methacrylate and ethylene/glycidyl methacrylate.

A particularly preferred polymeric grafting agent is a copolymer of at least 55% by weight ethylene, 1 to 10% by weight of an unsaturated epoxide of 4 to 11 carbon atoms, and 0 to 35% by weight of at least one alkyl acrylate, alkyl methacrylate, or mixtures thereof where the alkyl groups contain 1 to 8 carbon atoms. Preferred unsaturated epoxides are glycidyl methacrylate and glycidyl acrylate, which are present in the copolymer at a level of 1 to 7% by weight. Preferably, ethylene content is greater than 60% by weight and the third moiety is selected from methyl acrylate, iso-butyl acrylate, and n-butyl acrylate.

The composition of grafting polymer used is a terpolymer of 71.75 wt. % ethylene, 23 wt. % n-butyl acrylate, and 5.25 wt. % glycidyl methacrylate abbreviated as E/nBA/GMA-5. Another composition still described as EBAGMA-5 is an ethylene/n-butyl acrylate/glycidyl methacrylate terpolymer derived from 66.75 weight percent ethylene, 28 weight percent n-butyl acrylate, and 5.25 weight percent glycidyl methacrylate. It has a melt index of 12 g/10 minutes as measured by ASTM method D1238. The ethylene/acid copolymers and their methods of preparation are well known in the art and are disclosed in, for example, U.S. Pat. Nos. 3,264,272; 3,404,134; 3,355,319 and 4,321,337.

The copolymers are termed ionomers when the acid is neutralized in whole or in part to produce a salt. The cations for the salts are usually an alkali metal such as sodium, potassium, zinc or the like. "Acid copolymers" or "ionomers" referred to herein may be direct copolymers or graft copolymers. The ionomer used is a commercial product sold by DuPont as Surlyn® 9320. EBAGMA polymers are sold by the Dupont Company as Elvaloy PTW (EBAGMA-5) and Elvaloy 4170 (EBAGMA-9). The terms EBAGMA-5 and Elvaloy PTW are interchangeable. Lotader AX8900 made by Arkema is also a suitable grafting agent. It is a terpolymer of ethylene, methyl acrylate, and glycidyl methacrylate (EMAGMA). The groups of the ionomer could react with the grafting polymer but does not seem necessary from examples presented here.

There are two main categories of epoxy resins, namely the glycidyl epoxy, and non-glycidyl epoxy resins. The glycidyl epoxies are further classified as glycidyl-ether, glycidyl-ester and glycidyl-amine. The non-glycidyl epoxies are either aliphatic or cycloaliphatic epoxy resins. Glycidyl epoxies are prepared via a condensation reaction of appropriate dihydroxy compound, dibasic acid or a diamine and epichlorohydrin. While, non-glycidyl epoxies are formed by peroxidation of olefinic double bond.

Glycidyl-ether epoxies such as, diglycidyl ether of bisphenol-A (DGEBA) and novolac epoxy resins are most commonly used epoxies. Diglycidyl ether of bisphenol-A (DGEBA) is a typical commercial epoxy resin and is synthesized by reacting bisphenol-A with epichlorohydrin in presence of a basic catalyst. The properties of the DGEBA resins depend on the value of n, which is the number of repeating units commonly known as degree of polymerization. The number of repeating units depends on the stoichiometry of synthesis reaction. Typically, n ranges from 0 to 25 in many commercial products.

Novolac epoxy resins are interchangeably described as glycidyl ethers of phenolic hydroxyl containing novolac resins or glycidyl ethers of phenolic novolac resins, with the first term being more common. Phenols are reacted in excess, with formaldehyde in presence of acidic catalyst to produce phenolic novolac resin. Novolac epoxy resins are synthesized by reacting phenolic novolac resin with epichlorohydrin in presence of sodium hydroxide as a catalyst. Phenolic, cresol and bisphenol-A novolacs are some more widely used novolacs. Examples of some of the classes of novolacs are epoxy bisphenol A novolac, epoxy phenolic novolac, epoxy cresol novolac, epoxy o-cresol novolac, and bisphenol-F (BPF) epoxy novolac.

Novolac epoxy resins generally contain multiple epoxide groups. The number of epoxide groups per molecule depends upon the number of phenolic hydroxyl groups in the starting phenolic novolac resin, the extent to which they reacted and the degree of low molecular weight species being polymerized during synthesis. The multiple epoxide groups allow these resins to achieve high cross-link density. Novolac epoxy resins are widely used to formulate the molding compounds for microelectronics packaging because of their superior performance at elevated temperature, excellent mouldability, and mechanical properties, superior electrical properties, and heat and humidity resistance.

Amines are the most commonly used epoxy curing agents for epoxy cure. Primary and secondary amines are highly reactive with epoxy. Tertiary amines are generally used as catalysts, commonly known as accelerators for epoxy cure reactions.

The classes of polymers to which the flame retardants are applicable are not limited to the following but shall include all polymers. And in particular shall include the following: acrylic, butyl, cellulosics, epoxy, furan, melamine, neoprene, nitrile, nitrocellulose, phenolic, polyamide, polyester, polyether, polyolefin, high impact polystyrene (HIPS), ethylene propylene diene monomer rubber (EPDM), polysulfide, polyurethane, polyvinyl butyral, silicone, copolymer of Acrylonitrile, Butadiene, and Styrene (ABS), styrene-butadiene, butyl rubber, and vinyl. Polymer and polymer compositions to which the flame retardants of the invention are applicable to include the following: 1. Mono and diolefins such as polypropylene (PP), thermoplastic olefins (TPO), polyisobutylene, polymethylpentene, polyisoprene, polybutadiene, polyethylene with or without cross linking, high density polyethylene, low density polyethylene, or mixtures of these polymers. Copolymers of mono and diolefins including other vinyl monomers such as ethylene-propylene copolymers, ethylene-vinyl acetate copolymers. Terpolymers of ethylene with propylene and a diene such as hexadiene, cyclopentadiene or ethylidiene norborene and vinyl monomers such as vinyl acetate. Mixtures of polymers under 1. 2. Polystyrene, poly p methyl styrene, poly .alpha. Methylstyrene, and copolymers of styrene or .alpha. Methylstyrene with dienes or acryl derivatives such as styrene-butadiene, styrene-actrylonitrile, styrene-alkylmethylacrylate, styrene-butadiene-akylacrylate, styrene-maleic anhydride, and styrene-acrylonitrile-methylacrylate. 3.

Polyphenylene oxide and polyphenylene sulfide and their mixtures with styrene polymers or with polyamides. 4. Polyurethanes derived from polyethers, polyesters and polybutadiene with terminal hydroxy groups on one hand and aliphatic or aromatic polyisocyanates on the other as well as their precursors. 5. Polyamides and copolymers derived from diamines and dicarboxylic acids and/or from aminocarboxylic acids or the corresponding lactams, such as polyamide 4, polyamide 6, polyamide 6/6, 6/10, 6/12, 4/6, 66/6, 6/66, polyamide 11, polyamide 12, aromatic polyamides based on aromatic diamine and adipic acid: and iso- and/or terephthalic acid and optionally an elastomer as modifier, for example poly-2,4-trimethyl hexamethylene terephthalamide, poly m phenylene-isophthalamide. 6. Polyesters derived from dicarboxylic acids and dialcohols and/or from hydrocarboxylic acids or the corresponding lactones such as polyethylene terephthalate (PET), polybutylene terephthalate (PBT), polyethylene terephthalate/polybutylene terephthalate mixtures, polyethylene terephthalate/polybutylene terephthalate copolymers, poyl 1,4-dimethyl ciclohexane terephthalate, polyhydroxybenzoates, ENGAGE™ Polyolefin Elastomers, and co-polymers with ethylene. 8.

Thermoset polymers include for example unsaturated polyester resins, saturated polyesters, alkyd resins, amino resins, phenol resins, epoxy resins, diallyl phthalate resins, as well as polyacrylates and polyethers containing one or more of these polymers and a cross linking agent. A review of thermosets is found in Ullmann's Encyclopedia of Industrial Chemistry, Vol A26, and p 665.

9. Polymers for insulation such as cross linked polyethylene (XLPE), ethylene-propylene rubber (EPR), tree cross linked polyethylene (TRXLPE), and ethylene vinyl acetate (EVA). 10. Cellulose acetate, flexible polyurethane, rigid polyurethane. 11. Elastomers such as spandex as defined in Encyclopedia of Chemical Technology. Polyimides such as KAPTON®, DuPont Co., Wilmington, Del. And defined in Encyclopedia of Chemical Technology. 12. Polyethylene and its co-polymers. 13. Ethylene vinyl acetate, ethylene vinyl acetate carbon monoxide and ethylene n butyl acrylate carbon monoxide and ethylene n butyl acrylate glycidyl methacrylate, ethylene methyl, ethyl, and butyl acrylate ethylene (methyl, ethyl, buthyl) acrylate-vinyltrimethylsilane, or vinyltriethylsilane ethylene methyl acrylate and ethylene methyl acrylate MAME, ethylene acrylic and methacrylic acid, ethylene acrylic and methacrylic acid ionomers (Zn, Na, Li, Mg), maleic anhydride grafted polymers.

Examples of such other ingredients include carbon black, metal deactivators, glass fibers, graphite fibers, DuPont Kevlar.® aramid fibers, glass spheres, plasticizers, lubricants, silica, titanium dioxide, colorants, clay, mica, and other mineral fillers, flame retardants, antioxidants, ultraviolet stabilizers, heat stabilizers, processing aids, adhesives, and tackifiers. Other ingredients including flame retardants may be added to these compositions: For example, colorants are added for color. Mica, nano-clay, chopped glass, carbon fibers, aramids, and other ingredients can be added to alter mechanical properties. Other flame retardants both non-halogen and halogen can be added to form a flame retarded composition in order to capture synergies between different chemistries.

The composition may further comprise at least one optional grafting catalyst. Grafting catalysts are described in U.S. Pat. No. 4,912,167. The grafting catalyst is a source of catalytic cations such as $Al^{3+}$, $Cd^{2+}$, $Co^{2+}$, $Cu^{2+}$, $Fe^{2+}$, $In^{3+}$, $Mn^{2+}$, $Nd^{3+}$, $Sb^{3+}$, $Sn^{2+}$, and $Zn^{2+}$. The grafting catalyst will preferably comprise about 0.01 to about 3 parts by weight per hundred parts by weight of polymer and epoxy containing compound.

The compositions may be obtained by combining the component materials using any melt-mixing method known in the art. For example: 1) the component materials may be mixed to homogeneity using a melt-mixer such as a single or twin-screw extruder, blender, kneader, Banbury mixer, roll mixer, etc. to give a resin composition; or 2) a portion of the component materials can be mixed in a melt-mixer, and the rest of the component materials subsequently added and further melt-mixed until homogeneous. The compositions may be molded into articles using any suitable melt-processing technique. Commonly used melt-molding methods known in the art such as injection molding, extrusion molding, blow molding, and injection blow molding are preferred. The compositions may be formed into films and sheets by extrusion to prepare both cast and blown films. These sheets may be further thermoformed into articles and structures that may be oriented from the melt or at a later stage in the processing of the composition. The compositions may also be used to form fibers and filaments that may be oriented from the melt or at a later stage in the processing of the composition.

EXAMPLES

The humidity chamber is always run at 60° C., 90% relative humidity, and for at least 12 hours for all examples presented in the text. No other condition is used in humidity chamber experiments. The heat index for this condition is 313° C. (596° F.), which is an extreme condition. When the humidity chamber door is opened, one is hit with a force of hot steam that is quite unpleasant, as if subjected briefly to pressurized steam. Hot humid climates such New Orleans, La. normally have a heat index less than 41° C. (105° F.), because as the temperature rises, the humidity decreases rapidly to keep the heat index from going dangerously high. At a temperature of 38° C. (100° F.) and relative humidity of 55%, the heat index is 124° F., a very dangerous exposure for humans. Thus, a heat index of 313° C. (596° F.) is very extreme.

PNS stands for diethylenetriamine polyphosphate, as already described and prepared by ion exchange. PNS is the only ethyleneamine polyphosphate used in all the examples. Torque stands for reading on Brabender meter at end of run for samples. All samples are run for 4 minutes in the Brabender mixer. The tensile strength is in PSI and the elongation is in percent in the text. The amounts of ingredients are in grams. Thicknesses such as plaques are in inches. The plaques were made in a press and then appropriate test bars cut from the plaque. Because there is no orientation, the mechanical properties may differ for samples made by different mixers and test bars made with a molding machine. The UL94 test is one of the tests used for flame retardance.

The loading of the flame retardant depends on the desired use. Our goal is to make a flame retardant containing composition that has a very high level of flame retardation to compete with PVC and fluoropolymers. It is desirable to create compositions with a very high loading of FR from 40% to 67% by weight. The flame retardant ethyleneamine polyphosphate and an organic polymer are incompatible at high loadings and such samples suffer from problems of stickiness and poor mechanical properties. Efforts to fix this problem have included adding different kinds of polymers including rubbers, fumed silica, organic phosphates, talcs, clays, nano-particles, plasticizers, and PVC compatibilizers with marginal improvement.

To obtain high overall flame retardant loading, it has been found beneficial to add a second solid flame retardant such as melamine, melamine pyrophosphate, melamine polyphosphate, piperazine phosphate, and piperazine pyrophosphate. The loading is from 0.5% to about 40% of weight of composition. The preferred is 2% to 20% and the most preferred is about 5% to 15% by weight.

FP 2200 is obtained from Amfine Corporation and was represented as containing piperazine phosphate, piperazine pyrophosphate with about 5% by weight zinc oxide. FP2100J is also a piperazine phosphate/pyrophosphate. CEASEFIRE AC2 FG was obtained from Broadview Corporation, Newark, N.J. and is thought to be ground melamine pyrophosphate with a surface coating. Melapur 200 is available from BASF, Germany and is represented as being melamine polyphosphate. Aerosil R972 is a hydrophobic fumed silica. CABOSIL M7D (also labeled as Cabosil) is uncoated fumed silica available from the Cabot Corp., Boston, Mass. Min u sil 5 is a ground silica with average particle size of 5 microns and is available from US Silica, Berkeley Springs, W. Va. Albemarle Corporation, Baton Rouge, La. makes Ncendx P30, an organic phosphate. Kraton 1651 is a rubber available from Kraton Corp., Houston, Tex. Elvax EVA polymers and Ebagma are polymers available from DuPONT Co., Wlimington, Del. Epon 1009F and Epon 828 are DGEBA epoxy resins. Epon 164 and Epon SU-8 are novolac resins. The Epon resins are from Momentive Corp., Houston, Tex. The examples below use specifically Elvaloy PTW which is EBAGMA-5.

The essentials of claims are demonstrated with examples. Example 49-5 contains 90% PNS with 10% Elvax 250. Example 49-11 contains 24.7 g Elvax 260, 15 g FP 2200, 1.5 g Cabosil m7d, and 22.2 g (Ex 49-5). Example 49-12 contains 24.7 g Elvax 260, 7.8 g FP 2200, 1.5 g Cabosil m7d, and 29.4 g (Ex 49-5). The result is that neither sample passes the humidity chamber test with an EVA mixed into PNS. Example 49-6 contains 90% PNS and 10% Kraton 1651. It is used in example 49-13 (contains 24.7 g Elvax 260, 7.8 g FP 2200, 1.5 g Cabosil m7d, 3 g Ncendx P30, and 29.4 g (Ex 49-6)). The result is the sample fails the humidity chamber test even with Ncendx P30 and Kraton 1651.

Example 49-7 contains 91% PNS and 9% ELVALOY PTW. It is used in example 49-17 (contains 24.7 g Elvax 260, 7.8 g FP 2200, 1.5 g Cabosil m7d, and 29.4 g (Ex. 49-7)). The result is the sample passes the humidity chamber test with ELVALOY PTW mixed into PNS. Example 49-14 (contains 24.7 g Elvax 260, 2 g Elvaloy PTW, 7.8 g FP 2200, 1.5 g Cabosil m7d, and 29.4 g Ex. 49-7) uses sample 49-7 and additional 2.0 g of ELVALOY PTW. The result is that the humidity chamber test is passed.

Samples 49-15 (contains 24.7 g Elvax 260, 2.2 g Elvaloy PTW, 27.2 g PNS, 7.8 g FP 2200, and 1.5 g Cabosil m7d) and 49-16 (contains 25.8 g Elvax 260, 1.1 g Elvaloy PTW, 27.2 g PNS, 7.8 g FP 2200, and 1.5 g Cabosil m7d) contain normal PNS and 2.2 g and 1.1 g respectively of ELVALOY PTW. Both pass humidity test indicating that ELVALOY PTW can be added directly to the composition or added to the PNS and then to the composition. Sample 49-18 was a repeat of sample 49-15 and passes humidity chamber testing.

Samples 39-7 (contains 24.7 g Elvax 260, 2.2 g Kraton 1651, 20. g PNS, 14 Cease Fire AC2, and 1. g Cabosil m7d), and 48-5 (contains 26.9 g Elvax 260, 20 g PNS, 15 g FP 2200, and 1.5 g Cabosil m7d) are standard samples using PNS and do not pass the humidity chamber test. Similar samples made with Kraton rubber or ethylene vinyl acetate (EVA) polymer do not pass humidity chamber test indicating that an epoxy containing compound such as polymer grafting agent such as Ebagma are essential and provide unique capability to obtain moisture resistance.

Sample 49-19 (contains 22.5 g Elvax 260, 27.2, 7.8 g Cease Fire AC2, 31.6 g (ex 49-8) and 1.5 g Cabosil m7d) contains sample 49-8 (7.5 g Elvax 250, 7.5 g Elvaloy PTW, 67.5 g PNS) and passes humidity chamber. The significance of this is that a form of PNS that is easy to handle can be made by the addition of ELVALOY PTW and another polymer such as Elvax 250, other polymers can be acceptable as well. This form of PNS contains 20% polymer and is rather resistant to rapid moisture absorption as compared to pure PNS. This form is strong enough to form strands that are chopped coming out of an extruder to form an easy to use pelletized form of PNS. The first polymer needs to be a polymer with epoxy containing compound such as ELVALOY PTW, whereas the second polymer can be any polymer that melts easily into PNS.

The preferred amount of the second polymer that does not contain the epoxy group whose function is to decrease brittleness is from 1% to 20% by weight of final composition. The more preferred is from 3% to 10% and the most preferred is from 5% to 10% by weight of final composition. The preferred polymer is an olefin. The most preferred is an EVA.

It should further noted that samples 49-15, 49-16, and 49-17 passed UL94 testing at 0.03 in thickness which is a very high level of flame retardation. Samples 49-15 (tensile strength=1792 psi, elongation=170%) and 49-16 (tensile strength=1527 psi, elongation=147%) show that ELVALOY PTW containing samples have very good tensile strength and elongation.

The above samples 49-14 to 49-18 were placed in water for one week at 23° C. The FR tested before and after submersion in water showed no noticeable change in flame retardant properties as measured by UL94 even a substantial increase in weight occurs. Thus, no apparent leaching of PNS which had been a problem even though the weight increased by 25% or more. That achievement was obviously due to the glycidyl epoxy bonds. In a conventional oven, the samples dry to near their original weight.

Samples 55-6 (37 g Ti 4020N PP, 18 g PNS, 5 g Elvaloy PTW), 55-7 (42 g Ti 4020N PP, 18 g PNS), 55-9 (40 g Petrothene LR5900, 20 g PNS) and 55-8 (35 g Petrothene LR5900, 20 g PNS, 5 g Elvaloy PTW) deserve special mention. Petrothene LR5900 is a HDPE with a fractional melt of 0.7. PP and HDPE samples 55-6 and 55-8 with ELVALOY PTW did pass the humidity chamber, whereas samples 55-7 and 55-9 without Elvaloy PTW did not pass. These samples show the importance of EBAGMA as a compatibilizing agent that enables mixing of PNS into fractional melt HDPE, as well as PP.

The tensile strength and elongation was high for both PP samples 55-6 (2212 psi, 207%) and 55-7 (2316 psi, 457%). For HDPE, the tensile strength and elongation was good for fractional melt HDPE samples, 55-8 (2484 psi, 54%) and 55-9 (2786 psi, 50%).

Sample 62-5 has the composition 20 g Elvax 260, 39 g PNS, 2 g Elvaloy PTW, and 5 g Ceasefire AC2. The percent loading of FR is 67 but the mechanicals are good with an elongation of 63 and tensile strength 0f 1308 psi. This sample passed the humidity chamber test and was V0 at 0.03 in. The elongation will be higher when the polymer has some orientation as in cable jackets and better mixing.

It is useful to add the grafting agent or epoxies in nearly all FR loadings to obtain the improved mechanical performance and ease of handling of ethyleneamine polyphosphates that contain the grafting agent or epoxy resin.

Samples were also made with EPON 828, a DGEBA epoxy resin of low molecular weight. Sample 54-18 is composed of 34.7 g Elvax 450, 35 g PNS, and 2.6 g of Epon 828. This samples passed the humidity chamber test. The elongation was 64%, and the tensile strength was about 662 PSI. This sample passed UL94 test with rating of V0 at 0.03 in thickness.

It is well known by now that ethyleneamine polyphosphates melt and disperse into the polymer apparently at any ratio and provide excellent flame retardation. Samples 49-5, 49-6, 49-7, 49-8 were made at very high ratio ethyleneamine polyphosphates to polymer for very different polymers, suggesting that such dispersions could be done for all polymers that melt at temperature less than 200° C., especially olefins and gylcidyl containing polymers. The discovery here is that use of a gylcidyl containing material results in a composition that resists becoming sticky in a humidity chamber at the prescribed conditions.

Samples 65-10a (14.3 g Nordel 4725, 14.3 g Engage 8450, 18.5 g (Ex 65-21), 15. g FP2100j, and 1.2 g R972), 65-10b (14.3 g Nordel 4725, 14.3 g Engage 8450, 18.5 g (Ex 65-21), 18.5 g FP2100j, and 1.2 g R972), and 65-10c (14.3 g Nordel 4725, 14.3 g Engage 8450, 2.5 g Epon 1009F, 16 g PNS, 18.5 g FP2100j, and 1.2 g R972) deserve special mention. Sample 65-21 is a flame retardant composition prepared by reacting 10 g of Epon 1009f and 64 g of PNS in the Brabender at 175° C. Sample 65-21 was then used in samples 65-10a and 65-10b with no additional epoxy containing compound. The PNS was contained within 65-21.

The tensile strength seems to be better in 65-10a (1506 psi) and 65-10b (1172 psi) as compared to 65-10c (1038 psi) made in the standard manner. The FR is similar in all three samples, V0 at 0.03 in thickness. Sample 65-21 absorbs water at a slower rate than PNS which is an important variable. This experiment shows the value of mixing or reacting the compatibilizer, whether it is epoxy polymer or epoxy resin, with PNS first and then adding to the polymer or resin being flame proofed to pass humidity chamber test.

Momentive Corporation, Houston, Tex. offers a variety of epoxy curing agents for resins: waterborne curing agents, amidoamines, polyamides, aliphatic amines, modified aliphatic amines, anhydrides, ketimines, powder coating curatives, non-amine curatives, polyether amine, cycloaliphatic amine, modified cycloaliphatic amine, modified cycloaliphatic amine adduct, tertiary amine, dicy imidazole adduct, phenolic, polyamine, non-mda aromatic amine. These are proprietary to the manufacturer and exact chemical names are not revealed, just the chemical classifications.

The examples using Elvaloy PTW as a compatibilizer between the polymer and ethyleneamine polyphosphate appear to stop the samples from stickiness but will absorb substantial amount of water if soaked for seven days. The next examples will utilize the flame retardant synthesized by reacting epoxy containing compounds with ethyleneamine polyphosphate. Specifically, all the examples use PNS, diethylenetriamine polyphosphate, reacted with EPON 1009F, a DGEBA resin, and Epon SU8, a novolac epoxy resin. All the compositions were prepared by mixing the components in a Brabender heated at 175° C. for about 4 minutes.

The first example consists of mixing in the Brabender a composition containing 60% Elvaloy PTW and 40% PNS. A 0.125 in plaque was soaked in water for 7 days and the weight was found to have doubled.

The first step was to react 375 g PNS with 125 g Epon SU8 in the Brabender to form Ex 3281. A huge decrease in torque occurred as the reaction occurred and a slight odor. The next step was to react 200 g of the previous step (Ex. 3281) with 150 g of melamine as an epoxy crosslinking agent to from Ex. 3306. The flame retardant containing composition example 3307 was prepared by reacting in the Brabender 60 g Nordel EPDM 4725, 60 g Engage 8450, with 142 g example 3306. A 0.125 in plaque soaked in water for 6 days only gained 1.5% water. When example 3281 was soaked in water, a white slime with particles does eventually appear but no apparent syrup. It also did not have the stickiness associated with the syrup that forms when PNS is dissolved in water. Straight PNS dissolved in water yields 2-3 g syrup which is very sticky to the touch.

Example 353 was formed by mixing 320 g PNS with 36 g of Epon 1009F. The flame retardant containing composition (Ex. 362) was prepared by mixing 72 g Nordel EPDM 4725, 72 g Engage 8450, and 122 g example 353. A 0.125 in plaque soaked in water for 6 days gained 6.5% water. When example 353 was soaked in water, some syrup appears in addition to some white slime.

Example 3207 was prepared by reacting 339 g PNS, 72 g Epon 164, and 41 g Elvaloy PTW. Example 3271 was prepared by mixing 131 g Ex 3207 with 140 g Nordel EPDM 3745P. Ex 3271 soaked in water for six days gained less than 2% water. Example 3272 was prepared by mixing 131 g Ex 3207 with 140 g Elvax 265 from the DuPont Co. Ex. 3272 gained nearly 6% water which shows the importance of choosing a polymer with some inherent cross linking.

Example 3151 was prepared by reacting 180 g PNS, 20 g Epon SU8, and 150 g Fp2100J in the Brabender. Example 3153 was prepared by mixing 150 g Ex 3151, 55 g Nordel 4725, and Engage 8450. Sample 3153 plaque absorbed 1.8% water after being soaked for seven days.

Sample 44B was prepared by mixing 300 g Ex 3281 with 80 g melamine in the Brabender. Example 448 was prepared in the Brabender by mixing 126 g Royal Edge 4170 EPDM from Lion Copolymer located in Canada, 80 g Ex. 44B, 30 g FP2100J, 10 g Melamine, and 4 g Aerosil R972. When soaked for 6 days, less than 0.5% water absorption, the best sample made.

The melamine is believed to be acting as a cross linker or hardener. In the next examples TETA will be used as the hardener or epoxy cross linker. Flame retardant composition 428a was formed in the Brabender by reacting 338 g PNS, 112 g Epon SU8, 8 g TETA, and 7 g Aerosil R972. Flame retardant containing composition 4281 was formed by mixing 120 g Royal Edge 4170, 100 g sample 428a, 42 g FP2100j, and 6 g Aerosil R972. A 0.125 in plaque soaked in water for 6 days gained approximately 1% in weight.

It should be noted that the cross linking reaction between PNS and Epon SU8 in that there is a substantial odor and the viscosity meter drops from the range of 25-35 to the range of 6-12. The reaction between Epon 1009F and PNS is less and the reaction between PNS and Elvaloy PTW is even lower.

Sample 532 (120 g Royal Edge 4170, 100 g sample 428a, 42 g FP2100j, 13 TETA, and 6 g Aerosil R972) seemed more flexible than sample 4281 due to the extra TETA. The extra TETA seemed to increase the intumsence when burned in an intense flame from a torch using propylene. A plaque of 532 soaked in water for 6 days had a weight increase of approximately 0.5% suggesting that addition of extra TETA in the Brabender increased cross linking and thereby water resistance. Flame retardant composition 53a is formed by reacting 225 g PNS, 75 g Epon SU8, 60 Fp2100j, 7 g TETA, and 5 g Aerosil R972. Flame retardant containing composition 533 was formed by mixing 120 g Royal Edge 4170, 120 g sample 53a, 22 g FP2100j, 10 g TETA, and 5 g Aerosil R972. The weight gain of a sample in water for 6 days was about 1%.

Flame retardant composition 427a is formed by reacting 360 g PNS, 90 g Epon SU8, 9 g TETA, and 7 g Aerosil R972. Sample 4272 (120 g Royal Edge 4170, 100 g (sample 427a), 42 g FP2100j, and 5 g Aerosil R972) gained 2% by weight water when soaked for 6 days. A rod approximately 0.375 in in diameter passed six 15 second burns with the torch used in VW1 testing and with the rules of VW1 testing. Passing such a test without the support of the inner copper conductor is a very high level of FR performance. A second run of Ex. 4272 with 1 g of Perkadox at the end of mixing. The torque meter increased by 50% in 30 seconds indicating that the peroxide was contributing to the building of many internal bonds. This sample was pressed into ⅛ in bars that gained only 1% water in 6 days of soaking.

Flame retardant compositions 428a and 53a were placed in water for 5 days, filtered, and dried. There was no evidence of syrup but a little slimy material did occur. More than 85% by weight of the compositions were recovered and some of it remained within the filter.

Flame retardant containing composition 4281 was placed in water at a temperature of 50° C. for 48 hours. This sample dried to nearly its initial weight in a conventional oven without vacuum suggesting that the flame retardant composition was not leached by the hot water.

All the examples thus far are intended to show that resins and polymers containing the epoxy bond compatibilize PNS with the polymer matrix to enhance moisture resistance.

The preferred epoxy containing compound is selected from the group consisting of polymer grafting agent of ethylene/n-butyl acrylate/glycidyl methacrylate; polymer grafting agent of ethylene/methyl acrylate/glycidyl methacrylate; diglycidyl ether of bisphenol-A with n from 0 to 25; and glycidyl ethers of phenolic hydroxyl containing novolac resins n from 0 to 15. The more preferred epoxy containing compound is selected from the group consisting of ethylene/n-butyl acrylate/glycidyl methacrylate terpolymer with glycidyl methacrylate content of 1 to 10% by weight, the diglycidyl ether of bisphenol-A with a value of n of 2 or greater, and the glycidyl ether of phenolic novolac resin with a value of n of 1 or greater. The most preferred epoxy containing compound is selected from the glycidyl ether of phenolic novolac resin with a value of n of 1 or greater. Commercial examples are Epon Su8 and Epon 164 from Momentive Corp., Houston, Tex.

The preferred epoxy curing agent is selected from the group consisting of DETA, TETA, AEP, TEPA, polyoxypropylenediamine, polyoxypropylenetriamine, p-phenylenediamine, m-phenylenediamine, diethyltoluenediamine, melamine, and dicyandiamide. The most preferred is DETA, TETA, AEP, TEPA and melamine.

For a flame retardant composition, the preferred amount of epoxy containing compound is from 30% to 5% by weight of composition with the most preferred being 25% to 15%. For a flame retardant composition, the preferred amount of epoxy curing agent is from 0.5% to 10% by weight of composition with the most preferred being 0.8% to 8%.

For a flame retardant containing composition, the preferred amount of epoxy containing compound is from 1% to 20% by weight of composition with the most preferred being 2% to 10%. For a flame retardant containing composition, the preferred amount of epoxy curing agent is from 0.5% to 8% by weight of composition with the most preferred being 0.8% to 5%.

Another type of curing is peroxide cure and it can be complimentary to epoxy resin curing agents. Organic peroxides are used for the cross linking of elastomers, silicone rubbers and thermoplastics and include a broad class of compounds. The classes of peroxide chemistry include diacyl peroxides, peroxyesters, dialkyl peroxides, peroxyketals and peroxymonocarbonates. The actual chemical compositions of the peroxides can be found on Akzo Nobel web site in most cases for the Trigonox and Perkadox peroxides. The right choice of cross linking peroxide depends on the processing conditions and the type of polymers. The process of cross linking covers a wide range of application areas and curing temperatures.

Organic peroxides, acting as free radical source, are known to crosslink a wide variety of polymers. Peroxide thermal decomposition generates very active free radicals capable of abstracting a hydrogen atom from the polymer backbone. This is possible both in unsaturated and saturated polymers. In cross linking applications, organic peroxide products act on the polymer itself, not the initial monomer. It "builds bridges" between the polymer chains to improve the mechanical properties and heat resistance of the product. In this invention, the moisture resistance is improved by the bridge building between chains.

The main market applications in the sector using peroxides are cable and wire manufacturing, industrial and mechanical rubber products for the automobile, construction and footwear industries, and the plastics industry for viscosity and molecular weight control.

The loading of peroxides is in the range of 0.5 to 8 PHR. The preferred loading of organic peroxides is at a level of about 1.2 phr to 3.4 phr. The most preferred is about 2.0 PHR. PHR is the parts per hundred parts of polymer resin, not the total composition. The peroxide curing agents are usually mixed for up to five minutes in a batch mixer at a temperature of 105° C. to 145° C. depending on the curing agent used. The composition is peroxide cured at 150° C. to 220° C. The curing for wire and cable can be done by passing the final cable through a steam heated sleeve, 199° C. (340° F.) steam for 5 minutes or so. Electron beam cross linking is an alternative to chemical cross linking.

Some peroxides of interest revealed on the Akzo Nobel web site are 1,1-Di(tert-butylperoxy)-3,3,5-trimethylcyclohexane, 2,5-Dimethyl-2,5-di(tert-butylperoxy)hexane, 2,5-Dimethyl-2,5-di(tert-butylperoxy)hexyne-3,3,3,5,7,7-Pentamethyl-1,2,4-trioxepane, Butyl 4,4-di(tert-butylperoxy) valerate, Di(2,4-dichlorobenzoyl) peroxide, Di(4-methylbenzoyl) peroxide, Di(tert-butylperoxyisopropyl) benzene, Dibenzoyl peroxide, Dicumyl peroxide, tert-Butyl peroxybenzoate, tert-Butylperoxy 2-ethylhexyl carbonate, 3,3,5,7,7-Pentamethyl-1,2,4-trioxepane, tert-Butyl peroxybenzoate, tert-Butyl peroxy-3,5,5-trimethylhexanoate, tert-Butyl cumyl peroxide, Di-tert-butyl peroxide, tert-Butylperoxy 2-ethylhexyl carbonate, and Di(tert-butylperoxyisopropyl)benzene Trigonox 117 (tert-Butylperoxy 2-ethylhexyl carbonate) and Perkadox 14 (Di (tert-butylperoxyisopropyl)benzene) are used in examples.

A peroxide that was found to be particularly effective for EVA is Trigonox 117 (sold by Akzo Nobel Corporation). An EVA (with 40% vinyl acetate monomer) was mixed with a loading of 40% PNS by weight and 3% Elvaloy PTW by weight. Then approximately 2 PHR of Trigonox 117 was added to the mixer. Films with and without Trigonox 117 were prepared and cured at 170 C. The sample with Trigonox was much stronger and very difficult to tear, whereas the sample without peroxide was easy to tear. The cross linking was very obvious from the tear strength. The sample with the peroxide cure was also found to be at least 15% less moisture pickup in the humidity chamber testing (60° C., 94% humidity, 12 hours) which is of particular importance.

A similar experiment was done for Engage 8450 and Nordel 4727, both from Dow Chemical. A composition consisting by weight 30% Nordel 4725, 30% Engage 8450, 2% Elvaloy PTW, and 38% PNS were mixed together in a Brabender at 175 C. Then, 2.2 PHR of Perkadox 14SF was added. Films with and without the peroxide were made and cured at 195 C. It was very obvious that the film with peroxide was much stronger to tear, showing the value of peroxide curing. The sample with the peroxide cure was also found to be at least 15% less moisture pickup in the humidity chamber testing. It was unexpected that polymers containing ethyleneamine polyphosphate can be cross-linked with peroxides. ELVALOY PTW also does not prevent cross linking with peroxides.

Finally a form of flame retardant composition that is easier to handle comprises 10% to 20% by weight of a thermoplastic polymer and 90% to 80% of the flame retardant composition.

One of the target applications is to pass riser UL1666 and plenum UL910 for communication cables. The desired construction is a halogen free jacket with wall thickness of 20 mil to 30 mill over a halogen free core of 4 pair of 8 mil PE primary insulation over 18-24 gauge copper conductors. First prepare PNS/PTW which contains 94% PNS and 6% Elvaloy PTW. Next, prepare a composition consisting of 32% Elvax 260, 2% Aerosil R972, 15% FP2100J, 44% sample PNS/PTW, 2% TETA, and 5% Elvaloy PTW. Prepare cable with 25 mil jacket over 4 pair 8 mil PE coated 22 gauge Cu conductors. This cable is to be tested for plenum UL910, riser UL 1666 test and UL VW1. If plenum test result is fail, then the next step is to raise the total flame retardant content to 67% to 70% by weight and re-test. A person knowledgeable in W&C would know how to vary the content so as to maintain needed mechanical properties and still pass plenum. It may be necessary for the halogen free primary insulation over Cu wire to contain up to 15% of the flame retardant composition PNS/PTW to pass plenum UL910. Other polymers could have been chosen such as PP, Engage, EPDM, and PE. If better moisture resistance, the flame retardant composition should be 85% PNS by weight and 15% SU8 by weight.

Currently, most thermosets are processed with solvents to inject flame retardants and then made into the desired form such as printed circuit boards. It would be particularly to have a process for flame retarding thermosets and forming products without the use of solvents. The following shows that PNS can be incorporated into epoxy resins to make flame retarded epoxy resin that could be used to make products such as printed circuit boards. These flame retarded thermoset resins would make using a variety of molding techniques where the FR epoxy resins is melted and injected into a form with the desired shape. The range of composition encompasses flame retarded thermoset epoxy resins as well.

The next example demonstrates how a resin can be flame retarded with the ethyleneamine polyphosphate flame retardants. In example 58-11, 56 g of Epon 1009f from Momentive Corporation, Houston, Tex. was mixed with 14 g PNS in a Brabender at 170° C. The DETA in PNS must react or cross link the resin but it remains flexible when heated above the melt point of Epon 1009f. The remaining step is to add an epoxy curing agent to cross link the resin to make a flame retarded thermoset. Because the flame retarded resin is flexible when heated, this provides a method to make flame retarded circuit boards and other products without the use of solvents, a major advance for the environment. The same procedure would be followed for polyester resins as well. The epoxy curing agents could be added just before injecting the resin into the desired shape.

An alternative approach is to grind the flame retardant composition to an average particle size of 1-3 microns in diameter. The ground flame retardant composition is then added to the epoxy resin that has been dissolved in the appropriate solvent. The standard steps are then taken to form the desired flame retarded thermoset product.

Epoxy curing temperature is a tradeoff between temperature of cure and time allowed to cure. Those skilled in the art would know what trade off works best.

For thermoset flame retardant containing compositions, the preferred thermoset is an epoxy resin. The most preferred resins are diglycidyl ether of bisphenol-A and glycidyl ether of phenolic novolac resin. The loading of flame retardants (soluble and insoluble flame retardant composition and ethyleneamine polyphosphate) is from 0.5% to 30% and the loading of resin is from 99.5% to 60%. A cured form is made by adding an epoxy curing agent at a loading of 0.5% to 20% by weight of total composition.

I claim:

1. A flame retardant composition comprising 75% to 99.5% by weight ethyleneamine polyphosphate cross-linked with 25% to 0.5% by weight of an epoxy containing compound selected from the group consisting of polymer grafting agent; glycidyl epoxies selected from: glycidyl-ether compounds, glycidyl-ester compounds and glycidyl-amine compounds; and glycidyl ethers of phenolic hydroxyl containing novolac resins.

2. The composition of claim 1 prepared by the method of reacting 75% to 99.5% by weight ethyleneamine polyphosphate and 25% to 0.5% by weight of an epoxy containing compound selected from the group consisting of polymer grafting agent; glycidyl epoxies selected from glycidyl-ether compounds, glycidyl-ester compounds and glycidyl-amine compounds; and glycidyl ethers of phenolic hydroxyl containing novolac resins.

3. The composition of claim 1 comprising 75% to 95% by weight ethyleneamine polyphosphate cross-linked with 25% to 5% by weight of an epoxy containing compound selected from the group consisting of polymer grafting agent; glycidyl epoxies selected from glycidyl-ether compounds, glycidyl-ester compounds and glycidyl-amine compounds; and glycidyl ethers of phenolic hydroxyl containing novolac resins.

4. The composition of any of claims 1 to 3, in which the epoxy containing compound is selected from the group consisting of polymer grafting agent of ethylene/n-butyl acrylate/glycidyl methacrylate; polymer grafting agent of ethylene/methyl acrylate/glycidyl methacrylate; diglycidyl ether of bisphenol-A with n from 0 to 25; and glycidyl ethers of phenolic hydroxyl containing novolac resins n from 0 to 15.

5. The composition as claimed in claim 4, in which the epoxy containing compound is selected from the group consisting of ethylene/n-butyl acrylate/glycidyl methacrylate terpolymer with glycidyl methacrylate content of 1 to 10% by weight, the diglycidyl ether of bisphenol-A with a value of n of 2 or greater, and the glycidyl ether of phenolic novolac resin with a value of n of 1 or greater.

6. The composition as claimed in claim 5, in which the epoxy containing compound is epoxy novolac resin with a value of n of 1 or greater.

7. The flame retardant composition of any of claims 1 to 3 additionally comprising 0.5% to 20% by weight of total composition an epoxy curing agent selected from the group consisting of waterborne curing agents, amidoamines, polyamides, aliphatic amines, modified aliphatic amines, anhydrides, ketimines, powder coating curatives, non-amine curatives, polyether amine, cycloaliphatic amine, modified cycloaliphatic amine, modified cycloaliphatic amine adduct, tertiary amine, dicy imidazole adduct, phenolic, phenolic novolac resin, polyamine, and non-mda aromatic amine.

8. The composition as claimed in claim 7, in which the epoxy curing agent is selected from the group consisting of diethylenetriamine (DETA), triethylenetetramine (TETA), aminoethylpiperazine (AEP), tetraethylenepentamine (TEPA), polyoxypropylenediamine, polyoxypropylenetriamine, p-phenylenediamine, m-phenylenediamine, diethyltoluenediamine, melamine, phenolic novolac resin, and dicyandiamide.

9. The composition as claimed in claims 1 to 3, in which the ethyleneamine polyphosphate is selected from the group consisting of ethylenediamine polyphosphate, diethylenetriamine polyphosphate, triethylenetetraamine polyphosphate, piperazine polyphosphate, amino ethyl piperazine polyphosphate, and tetraethylenepentaamine polyphosphate all prepared with polyphosphoric acid made by ion exchange.

10. The flame retardant containing composition consisting of: 1) 32% polymer selected from the group consisting of ethylene propylene diene (EPDM), ethylene vinyl acetate (EVA), polypropylene (PP), polvolefin elastomers, and polyethylene (PE), 2) 25%-45% flame retardant composition of claim 9, 3) 10%-25% a mixture of a piperazine phosphate and piperazine pyrophosphate, 4) 0.25%-3% peroxide curing agent selected from the group consisting of di(tert-butylperoxyisopropyl)benzene and tert-butylperoxy-2-ethylhexyl carbonate and 5) 0.5-4% hydrophobic fumed silica, all weights are in % composition and a sum of 100%.

11. A flame retardant containing composition comprising: 1) 20% to 96% percent by weight polymer, 2) 80% to 1% by weight of a flame retardant wherein the flame retardant is a mixture of 75% to 99.5% by weight ethyleneamine polyphosphate and 25% to 40.5% by weight of an epoxy containing compound with weight of flame retardant mixture being 100% and the epoxy containing compound is selected from the group consisting of polymer grafting agent; glycidyl epoxies selected from glycidyl-ether compounds, glycidyl-ester compounds and glycidyl-amine compounds; and glycidyl ethers of phenolic hydroxyl containing novolac resins, with the total composition being 100% by weight.

12. The composition of claim 11, in which the epoxy containing compound is selected from the group consisting of polymer grafting agent of ethylene/n-butyl acrylate/glycidyl methacrylate; polymer grafting agent of ethylene/methyl acrylate/glycidyl methacrylate; diglycidyl ether of bisphenol-A with n from 0 to 25; and glycidyl ethers of phenolic hydroxyl containing novolac resins n from 0 to 15.

13. The composition of claim 12, in which the epoxy containing compound is selected from the group consisting of ethylene/n-butyl acrylate/glycidyl methacrylate terpolymer with glycidyl methacrylate content of 1 to 10% by weight, the diglycidyl ether of bisphenol-A with a value of n of 2 or greater, and the glycidyl ether of phenolic novolac resin with a value of n of 1 or greater.

14. The flame retardant containing compositions of claim 11, additionally comprising 0.5% to 20% by weight of total composition an epoxy curing agent selected from the group consisting of waterborne curing agents, amidoamines, polyamides, aliphatic amines, modified aliphatic amines, anhydrides, ketimines, powder coating curatives, non-amine curatives, polyether amine, cycloaliphatic amine, modified cycloaliphatic amine, modified cycloaliphatic amine adduct, tertiary amine, dicy imidazole adduct, phenolic, phenolic novolac resin, polyamine, and non-mda aromatic amine.

15. The composition of claim 14, in which the epoxy curing agent is selected from the group consisting of diethylenetriamine (DETA), triethylenetetramine (TETA), aminoethylpiperazine (AEP), tetraethylenepentamine (TEPA), polyoxypropylenediamine, polyoxypropylenetriamine, p-phenylenediamine, m-phenylenediamine, diethyltoluenediamine, melamine, phenolic novolac resin, and dicyandiamide.

16. The composition of claim 11, in which the ethyleneamine polyphosphate is selected from the group consisting of ethylenediamine polyphosphate, diethylenetriamine polyphosphate, triethylenetetraamine polyphosphate, piperazine polyphosphate, amino ethyl piperazine polyphosphate, and tetraethylenepentaamine polyphosphate prepared with polyphosphoric acid made by ion exchange.

17. The composition of claim 11, in which the polymer is a thermoplastic.

18. The composition of claim 17, in which the polymer is selected from the group consisting of polyolefin, foamed polyolefin, high impact polystyrene (HIPS), acrylonitrile butadiene styrene-(ABS), poylphenylene sulphide (PPS), ethylene vinyl acetate, polyethylene, polypropylene, polyester, nylon, ethylene vinyl acetate co-polymer, polyethylene co-polymer, polypropylene co-polymer, polyester co-polymer, ethylene propylene diene (EPDM), polybutylene terephthalate (PBT), polyethylene terephthalate (PET), and nylon co-polymer.

19. The flame retardant containing compositions of claim 18 additionally comprising 0.1% to 7% by weight of composition hydrophobic fumed silica or hydrophilic fumed silica.

20. The flame retardant containing compositions of claims 18 additionally comprising 0.5 PHR to 8 PHR of a peroxide curing agent per 100 parts resin selected from the group consisting of diacyl peroxides, peroxyesters, dialkyl peroxides, peroxyketals and peroxymonocarbonates.

21. The flame retardant containing composition of claim 17 additionally comprising 0.5% to 40% by weight of total composition another flame retardant selected from the group consisting of melamine, a mixture of a piperazine phosphate and piperazine pyrophosphate, melamine polyphosphate, melamine pyrophosphate, piperazine phosphate, piperazine pyrophosphate, piperazine polyphosphate, a mixture comprising piperazine phosphate, piperazine pyrophosphate with about 5% by weight zinc oxide, and ground melamine pyrophosphate with a surface coating.

22. The composition of claim 11, in which the polymer is a thermoset with a loading of 20% to 96% selected from the group consisting of diglycidyl ether of bisphenol-A with n from 0 to 25; and glycidyl ethers of phenolic hydroxyl containing novolac resins n from 0 to 15.

* * * * *

UNITED STATES PATENT AND TRADEMARK OFFICE
CERTIFICATE OF CORRECTION

PATENT NO.        : 9,828,501 B2
APPLICATION NO.   : 14/117427
DATED             : November 28, 2017
INVENTOR(S)       : Robert Valentine Kasowski Page 1 of 1

It is certified that error appears in the above-identified patent and that said Letters Patent is hereby corrected as shown below:

Column 17 Line 44 in Claim 11: Change 40.5% to 0.5%.

Signed and Sealed this
Twenty-seventh Day of March, 2018

Andrei Iancu
*Director of the United States Patent and Trademark Office*